United States Patent [19]

Richardson

[11] 4,230,479

[45] Oct. 28, 1980

[54] PROCESS FOR IMPROVING THE QUALITY OF UREA-AMMONIUM NITRATE SOLUTION

[75] Inventor: Robert C. Richardson, Beatrice, Nebr.

[73] Assignee: Phillips Petroleum Company, Bartlesville, Okla.

[21] Appl. No.: 25,509

[22] Filed: Mar. 30, 1979

[51] Int. Cl.² ............................ C05C 9/00; C05C 1/00
[52] U.S. Cl. ........................................ 71/30; 71/64 C; 260/555 A
[58] Field of Search ........................... 71/30, 28, 64 C; 260/555 A

[56] References Cited

U.S. PATENT DOCUMENTS

| 2,022,672 | 12/1935 | Kniskern et al. | 71/30 X |
|---|---|---|---|
| 2,022,677 | 12/1935 | Kniskern et al. | 71/30 X |
| 2,549,430 | 4/1951 | Crittenden | 71/30 |
| 2,855,286 | 10/1958 | Harvey | 71/29 |
| 2,951,061 | 8/1960 | Gomory | 261/122 |
| 3,006,755 | 10/1961 | Adams | 71/61 |
| 3,295,927 | 1/1967 | Earley | 423/352 |
| 3,419,378 | 12/1968 | Kearns | 71/34 |
| 3,746,528 | 7/1973 | Johnson | 71/30 |
| 4,174,379 | 11/1979 | Froehlich et al. | 260/555 A X |

OTHER PUBLICATIONS

Sauchelli; Fertilizer Nitrogen; Reinhold Pub. Corp., N.Y.; 1964; pp. 259-260, 347-349.
Liquid Fertilizer Manual; NFSA, 910 Lehmann Bldg., Peoria, Ill.; 1967; pp. 17-1 through 17-3.

Primary Examiner—Kenneth M. Schor

[57] ABSTRACT

A hot blended urea/ammonium nitrate solution is cooled to below about 170° F., and then treated with nitric acid to substantially neutralize residual free ammonia, and thus reducing salting out temperatures in the treated solution, and reducing loss of urea.

9 Claims, No Drawings

PROCESS FOR IMPROVING THE QUALITY OF UREA-AMMONIUM NITRATE SOLUTION

FIELD OF THE INVENTION

The invention pertains to treating urea/ammonium nitrate solutions to reduce salting out temperatures. In another aspect, the invention pertains to urea/ammonium nitrate solutions of improved quality.

BACKGROUND OF THE INVENTION

An important commercial high nitrogen liquid fertilizer composition is one containing a mixture of ammonium nitrate and urea. For example, as taught in U.S. Pat. No. 3,746,528, ammonia is reacted with carbon dioxide, producing a urea plant reactor effluent containing significant amounts of the desired urea, as well as carbon dioxide, unreacted ammonia, and water. Generally, the unreacted ammonia is substantially vaporized off and "set" in an ammonium nitrate production plant. The urea solution then is admixed with aqueous ammonium nitrate to form a urea-ammonium nitrate solution.

Unfortunately, these high "N" containing fertilizer solutions have still had a slight undesirable ammonia content, and have exhibited unfortunately high salting out temperatures, such as 24° to 26° F., making them difficult to store and use in marginal temperature weather.

While such a so-produced urea solution is discussed as being "essentially ammonia-free", that "essentially" still is enough residual ammonia to spell trouble. The urea-ammonium nitrate solution resulting thus contains a small but an undesirable concentration, usually about 0.2 to 0.4 weight percent, of free ammonia. The residual free ammonia in the urea/ammonium nitrate solution is objectionable, since application of this fertilizer solution tends to cause, for example, a "burning" effect on young wheat plants.

In some instances, the ammonia-containing urea/ammonium nitrate solution has been treated wih nitric acid at such as 225° F. to 235° F. (107° C. to 113° C.) to reduce the residual ammonia. This, I find, results in some loss (reversion) of the urea.

U.S. Pat. No. 3,746,528 treats the urea production effluent containing carbon dioxide, unreacted ammonia, as well as water, and urea, in a neutralization zone with nitric acid at a relatively high temperature of about 257° to 347° F. (125° to 175° C.) and works to control the pH above about 6.5 to help avoid hydrolysis of the urea. This process provides a direct reaction/neutralization of the high ammonia content of the raw urea production effluent, resulting in an aqueous admixture of urea/ammonium nitrate.

However, such high temperature treatment is counterproductive. Some of the very valuable urea is lost by reversion back to ammonia and carbon dioxide which, obviously, is counterproductive.

BRIEF DESCRIPTION OF THE INVENTION

I have discovered that a urea/ammonium nitrate solution product exhibiting lower crystallization temperature and low residual ammonia can be obtained by neutralizing the free residual ammonia with nitric acid without decomposing the urea and without having to exercise precise pH control, if the neutralization is accomplished at a temperature below about 190° F., preferably in the range of about 150° to 190° F.

DETAILED DESCRIPTION OF THE INVENTION

In accordance with my invention, a fertilizer grade solution of urea/ammonium nitrate containing undesirable residual amounts of ammonia is cooled to a temperature below about 190° F., preferably in the range of about 150° F. to 190° F., more preferably about 170° F., and then treated with aqueous nitric acid sufficient to neutralize the residual free ammonia in the urea/ammonium nitrate solution.

Neutralization of the free ammonia in this fashion provides not only an ammonia-free solution in the real sense, but accomplishes this task at a set of conditions compatible with stability of urea and hence without decomposition of urea. My process results in increased overall production and higher urea content in the product. The solution exhibits, by my method, a residual free ammonia of 0.02 to 0.04 weight percent and a salting out temperature of 17° F. to 19° F. Higher urea content of the product, after treatment in accordance with my invention, is indicated by the desirably lower salting out temperature.

Urea normally is produced in commercial practice by the reaction of ammonia with carbon dioxide, producing an effluent containing urea, as well as residual carbon dioxide, unreacted ammonia, and water. The urea production effluent then is treated so as to vaporize the ammonia, and this ammonia is "set" in an ammonium nitrate production plant by reaction with aqueous nitric acid. This process results in a urea solution on the one hand, and an ammonium nitrate solution on the other hand. The urea-containing solution generally will contain about 34 to 36 weight percent urea. The ammonium nitrate solution will usually contain about 44.8 to 47 percent ammonium nitrate by weight. These solutions are hot due to the production steps involved.

The stream of ammonium nitrate solution and the stream of urea-containing solution are blended in a mixed tank at temperatures usually in the range of about 225° to 235° F., for convenience.

The urea-containing solution and the ammonium nitrate containing solution then are blended to produce an aqueous admixture of urea/ammonium nitrate containing about 32 to 32.7 weight percent nitrogen as "N", and this is blended with water what is known in the trade as "UAN" as it is commonly expressed in the fertilizer trade containing about 32 weight percent N. Thus, a "UAN" fertilizer solution would be expressed as 32-0-0 in the fertilizer trade, indicating 32 weight percent N as the element, and 0 phosphorus expressed as $P_2O_5$, and 0 potash expressed as $K_2O$.

The urea-containing solution after removal of unreacted ammonia still contains a small but undesirable residual concentration of ammonia, such as 0.2 to 0.6, usually up to about 0.5 weight percent, more usually about 0.2 to 0.4 weight percent free ammonia. The ammonia nitrate containing solution may also contain residual free ammonia.

In accordance with my invention, the hot mixed stream of urea/ammonium nitrate is cooled to a temperature of below about 190° F. but above 140° F., preferably about 140° F. to 190° F., because this temperature range is low enough that decomposition of urea is not a problem and high enough that precipitation of the urea or ammonium nitrate does not occur when aqueous nitric acid is injected into the solution to neutralize the residual ammonia, more preferably about 170° F. for convenience.

Cooling of the urea/ammonium nitrate solution can be readily accomplished by indirect means such as with cooling coils, though obviously these should be suitably resistant to the undesirable effects of traces of ammonia on certain metals, as is well known in the art. Free ammonia, particularly at elevated temperatures, can be hazardous to some copper-based alloys, for example. Cooling can be accomplished by any convenient means, cooling water in coils, ammonia refrigeration, or the like.

The cooled stream of residual ammonia-containing urea/ammonium nitrate solution then is treated with aqueous nitric acid in an amount sufficient to neutralize the small but undesirable amount of free ammonia. This will require about 1 gallon of aqueous 53 weight percent nitric acid per 350 lbs. of urea/ammonium nitrate solution, and can be readily adjusted in accordance with tests to determine the amount of the ammonia in the solution.

The aqueous nitric acid employed can be any of the commercially available grades, such as the concentrated of 70 to 71 weight percent, or other grades such as 52 to 54 weight percent which is a convenient strength sometimes used in fertilizer plants.

Contacting of the urea/ammonium nitrate solution containing undesirable amounts of residual ammonia with the aqueous nitric acid can be by any convenient means, as will be known in the arts. Conveniently, the acid can be added by means of an acid sparger on the discharge side of the solution cooler so as to provide adequate admixing in-line. If desired, the flow of hot urea/ammonium nitrate solution from the mixing or blending tank can be monitored by a suitable flow meter, and this then tied into an acid feed pump in order to inject the desired amount of nitric acid in proportion to the flow of cooled solution. Aqueous nitric acid handling equipment, storage facilities, acid transfer pumps, sparger lines, all, of course, should be suitably resistant to aqueous nitric acid solutions, and such materials are well known in the art.

EXAMPLE

The example following is intended to assist one skilled in the art to a further understanding of my invention. Particular materials used, relationships, ratios, are designed to assist one skilled in the art without being limitative of the scope of my invention, but only illustrative thereof and should be read in conjunction with my specification and claims.

A stream of 76.0 weight percent ammonium nitrate solution and a stream of 85.0 weight percent urea solution were blended in a mix tank at about 230° F. to produce 400 tons/day of a urea/ammonium nitrate solution containing about 35.0 weight percent urea and 45.0 weight percent ammonium nitrate. The urea/ammonium nitrate solution at this point contained an undesirable high concentration of 0.3 weight percent free ammonia.

The urea/ammonium nitrate solution was pumped from the mix tank through a cooler to reduce the temperature of the blended solution to about 170° F. 105 Gal/hr. of aqueous nitric acid 53 weight percent was injected through a sparger into the solution to lower the free ammonia concentration to about 0.03 weight percent. The sparger was located in the product line after the cooler.

Before my invention was put into use, aqueous nitric acid was added to hot blended solution in the mix tank to neutralize the free ammonia in the solution. The quantity of free ammonia in the finished solution was very hard to control and varied between 0.06 and 0.15 weight percent. Most importantly, the salting out temperature of the neutralized product ranged from about 24° F. to 26° F.

After my invention was put into use, the free ammonia was readily controlled very closely at around 0.03 weight percent in the finished solution, and the salting out temperature was much lower and ranged from 17° F. to 19° F. showing a much more stable solution with reduced urea loss.

The disclosure, including data, has illustrated the value and effectiveness of my invention. The knowledge and background of the field of the invention, of general principles of chemistry and of the fertilizer arts, as well as the example, have formed the bases to which the broad descriptions of the invention including the ranges of conditions have been developed, and together have formed the bases for my claims here appended.

I claim:

1. A process for producing high nitrogen urea/ammonium nitrate solutions exhibiting low salting out temperatures which comprises
   admixing a hot urea-containing solution and a hot ammonium nitrate containing solution, at least one of which containing free residual ammonia, said admixing resulting in a hot residual free ammonia containing urea/ammonium nitrate solution containing free residual ammonia in amounts undesirable in fertilizer applications,
   cooling said hot residual free ammonia-containing urea/ammonium nitrate solution below about 190° F. and above about 140° F., and
   contacting said cooled free ammonia-containing urea/ammonium nitrate solution with an amount of aqueous nitric acid effective to substantially neutralize said residual free ammonia, thereby producing a substantially ammonia free urea/ammonium nitrate product solution exhibiting a low salting out temperature in the range of about 17° F. to 19° F.

2. The process according to claim 1 wherein said cooling is to a temperature in the range of about 150° F. to 190° F.

3. The process according to claim 2 wherein said cooling is to a temperature of about 170° F.

4. The process according to claim 1 wherein said residual free ammonia contained in said residual ammonia-containing urea/ammonium nitrate solution prior to nitric acid treatment is in the range of about 0.2 to 0.6 weight percent ammonia.

5. The process according to claim 4 wherein said free ammonia is present in a range of less than about 0.5 weight percent.

6. The process according to claim 5 wherein said free ammonia is present in the range of about 0.2 to 0.4 weight percent.

7. The process according to claim 1 wherein the treatment with said nitric acid employs about 1 gallon aqueous 53 wt. % nitric acid per 350 lbs. of urea/ammonium nitrate solutions.

8. A process of producing a stablized low salting out temperature urea/ammonium nitrate solution which comprises:
   admixing at a temperature of about 225° F. to 235° F. a urea solution containing slight amounts of residual ammonia with an ammonium nitrate solution, wherein said urea-containing solution contains about 34 to 36 weight percent urea, said ammonium nitrate containing solution contains about 44.8 to 47 weight percent ammonium nitrate, wherein at least one of said urea or ammonium nitrate solutions contains a residual free ammonia content such that the resulting urea/ammonium nitrate solution contains about 0.2–0.4 weight percent free ammonia, cooling the resulting free ammonia-containing urea-/ammonium nitrate solution to a temperature of about 170° F. to 190° F. whereby subsequent treatment with nitric acid does not decompose said urea, and contacting said cooled free ammonia-containing urea-/ammonium nitrate solution with a sufficient quantity of aqueous nitric acid to substantially neutralize said free ammonia whereby said resulting substantially ammonia free urea/ammonium nitrate solution exhibits a salting out temperature of about 17° to 19° F.

9. A process according to claim 8 wherein:

said urea solution contains about 35 wt. % urea; said ammonium nitrate solution contains about 45 wt. % ammonium nitrate; and said nitric acid is aqeuous nitric acid containing 52–54 wt. % nitric acid.

* * * * *